H. J. SMALL & O. B. SCHOENKY.
CAR ROOF.
APPLICATION FILED SEPT. 8, 1910.
986,093.
Patented Mar. 7, 1911.
3 SHEETS—SHEET 1.
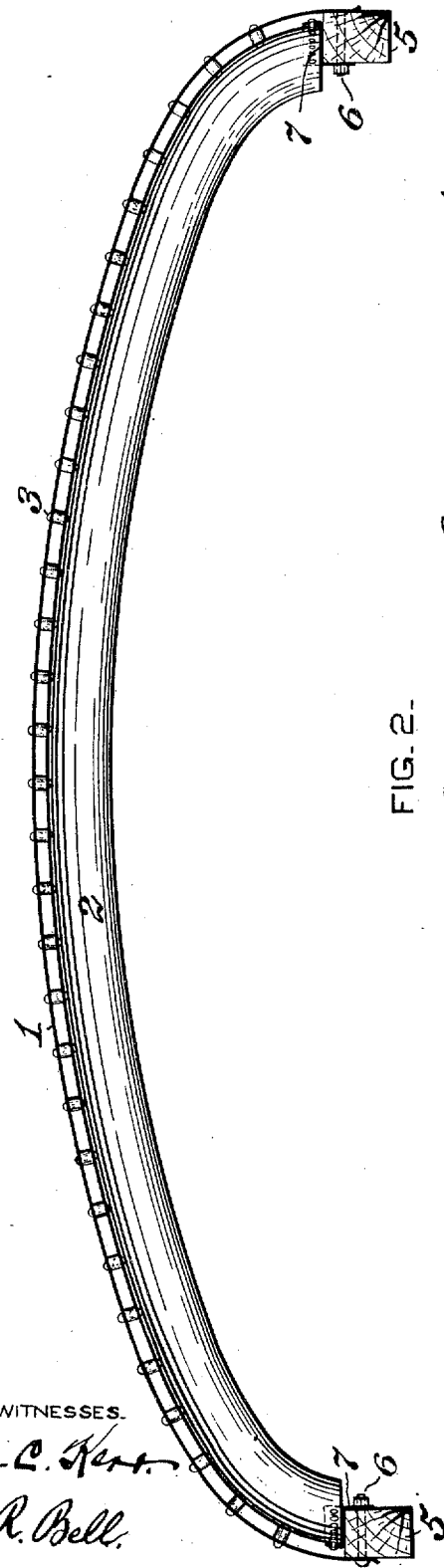
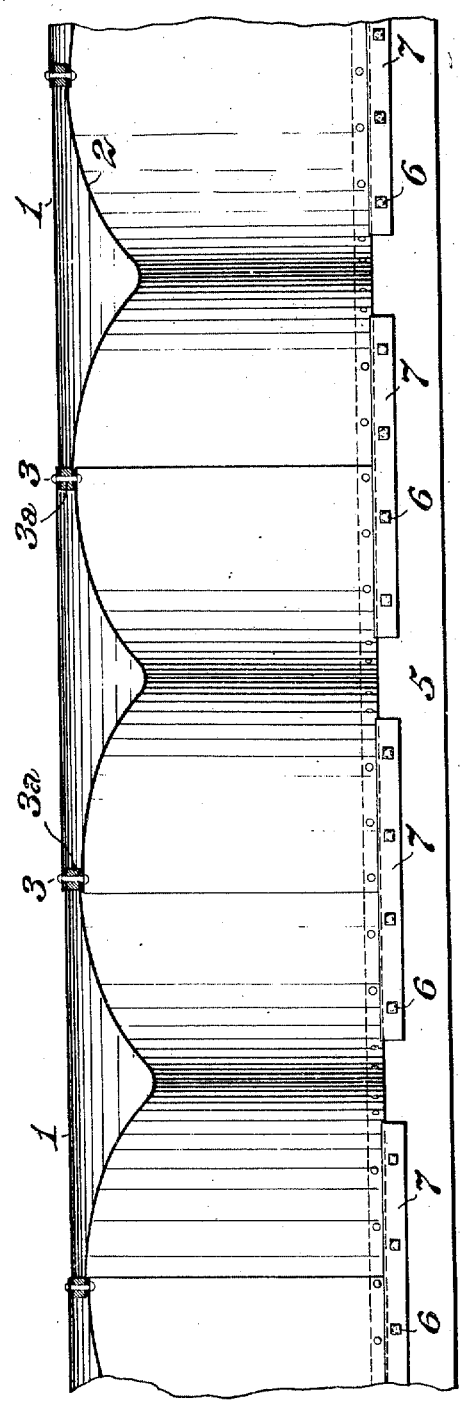

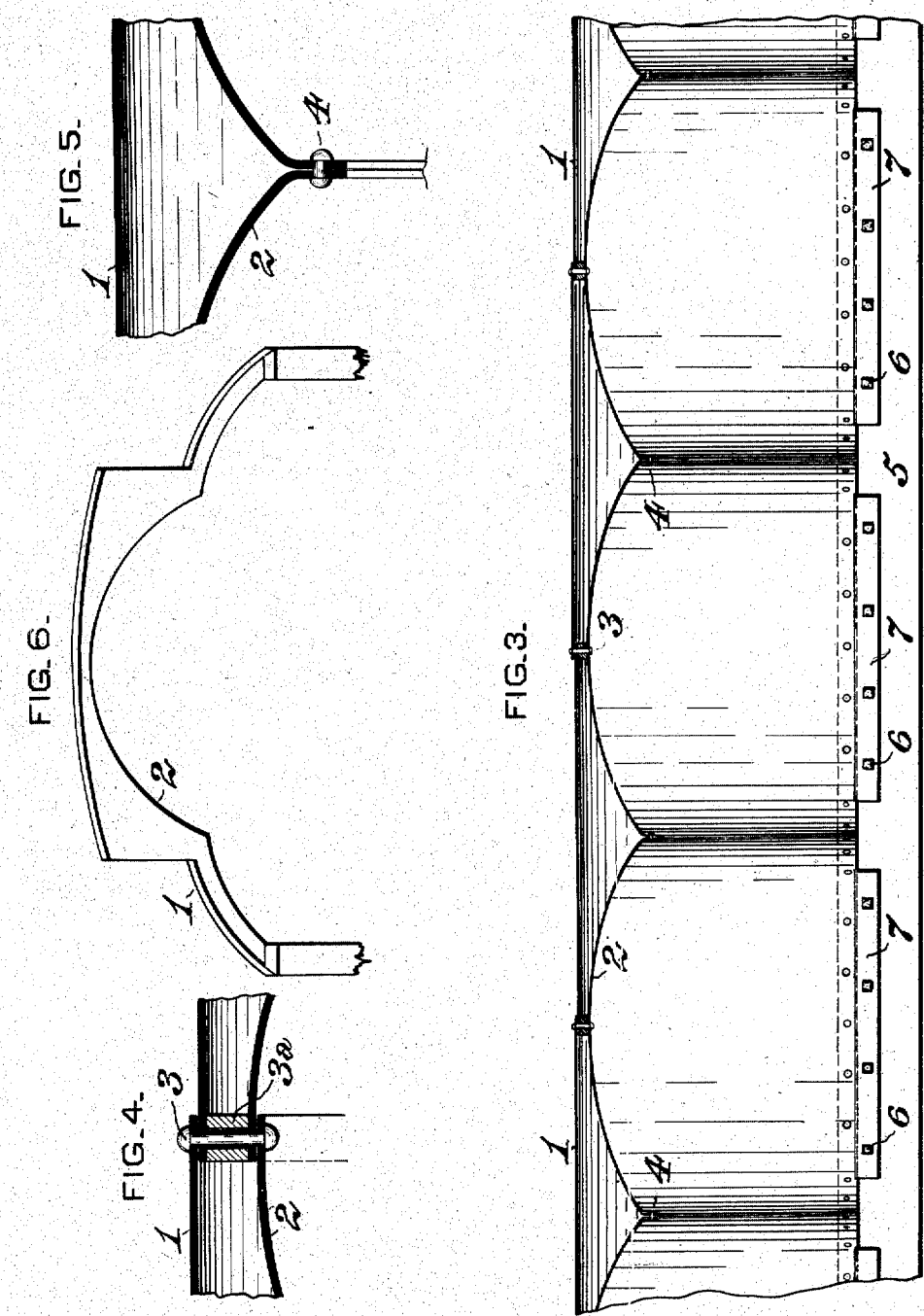

H. J. SMALL & O. B. SCHOENKY.
CAR ROOF.
APPLICATION FILED SEPT. 8, 1910.

986,093.

Patented Mar. 7, 1911.
3 SHEETS—SHEET 3.

WITNESSES
John C. Kerr
S. R. Bell

INVENTORS.
Henry J. Small
Otto B. Schoenky
by Snowdon Bell
Atty.

UNITED STATES PATENT OFFICE

HENRY J. SMALL, OF SAN FRANCISCO, AND OTTO B. SCHOENKY, OF EASTON, CALIFORNIA.

CAR-ROOF.

986,093.  Specification of Letters Patent.  Patented Mar. 7, 1911.

Application filed September 8, 1910. Serial No. 580,958.

*To all whom it may concern:*

Be it known that we, HENRY J. SMALL, of San Francisco, in the county of San Francisco and State of California, and OTTO B. SCHOENKY, of Easton, in the county of San Mateo and State of California, have jointly invented a certain new and useful Improvement in Car-Roofs, of which improvement the following is a specification.

Our invention relates to metallic roofs, which, while more particularly designed for use in railroad cars, are equally adaptable for application in vessels and buildings, and its object is to provide a roof which shall be of stronger and lighter construction than those previously known or put in practice, and in which the ordinary carlines or transverse framing may be dispensed with, thereby effecting a corresponding reduction of weight and cost.

The improvement claimed is hereinafter fully set forth.

In the accompanying drawings: Figure 1 is a vertical transverse section through a car roof, illustrating an embodiment of our invention; Fig. 2, a longitudinal central section through the same; Fig. 3, a similar section, illustrating a structural modification; Fig. 4, a partial longitudinal section, on an enlarged scale, through the car roof shown in Figs. 1 and 2; Fig. 5, a similar section, on a similar scale, through the car roof shown in Fig. 3; Fig. 6, a diagrammatic transverse section through a passenger car roof of the "monitor deck" type, in which the invention is applied; and, Figs. 7, 8, 9, 10 and 11, diagrammatic longitudinal sections through car roofs, showing, respectively, different forms of roof plates.

Figure 7:
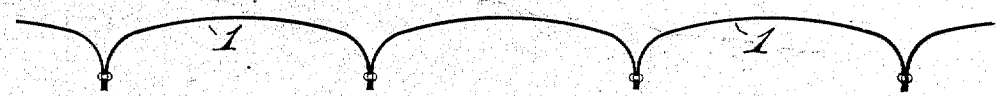

In the practice of our invention, we provide a plurality of outside sheets or plates of metal, 1, sufficient in number for the length of roof required, which sheets form the top of the roof, and are shaped to any desired contour or curvature in the transverse section of the roof. When these sheets are used to form the roof without being combined with the inside sheets hereinafter described, they are also curved or arched in the longitudinal section of the roof, as indicated in Fig. 7, so as to be self supporting, and to constitute a roof so stiffened as not to require framing. We also, in the preferred form of our invention, combine with the outside sheets, a plurality of inside sheets or plates of metal, 2, each of which is pressed or rolled into curved or arched form transversely, and may also be longitudinally channeled or curved, thus making the inside sheets of what may be termed "bowl" form. The inside and outside sheets are, in this form of roof, secured together, at the crowns of the arches formed by the junction of the inside sheets, or in the planes of the versed sines of the arcs of outer longitudinal curvature of the inside sheets, by rivets, 3, which pass through thimbles or distance pieces, 3ª, thereby providing a continuous air space throughout the length of the roof. The sides of the outside sheets, 1, are secured to the side plates or upper members, 5, of the car frame, by bolts, 6, and the side edges of the inside sheets, 2, are similarly secured to the side plates, preferably, as shown, by being riveted to the upper flanges of metal angle plates, 7, of substantially Z section, interposed between them and the side plates, the lower flanges of said angle plates being connected to the side plates by the bolts, 6. The arches of the inside sheets may be of any desired length, and the depth of their transverse concavity may also be varied as conditions may require or in accordance with any preferred design. The transverse curvature of the inside sheets may either be continuous, as shown in Fig. 1, or they may be bent into a plurality of transverse curves, as in Fig. 6, thereby adapting our improvement to the usual type of passenger car roof known as the "monitor deck." The outside and inside sheets, when shaped and secured together as above described, form a hollow section of which they are the extreme outer fibers and are at the greatest practical distance from the neutral axis, thereby taking advantage of increased inertia due to their distance therefrom and enabling weight of metal within the outer shells of the roofs, and carlines or other transverse framing, to be wholly dispensed with.

The modification shown in Fig. 3, while according in principle with the construction above described, differs therefrom in structural detail, in the particular that each of the inside sheets, 2, is bent in the longitudinal direction of the roof into a single outward curve instead of into two outward curves, as in the former case, each sheet thus forming a full arch of outward curvature, instead of practically two half arches as in the construction first described. The inside and outside sheets are, as before, secured together at the crowns of the arches by rivets, 3, passing through distance pieces, 3ª, and the transverse edges of the inside sheets are secured together, so as to make tight joints, either by rivets, 4, or by any suitable method of welding.

Figure 8:
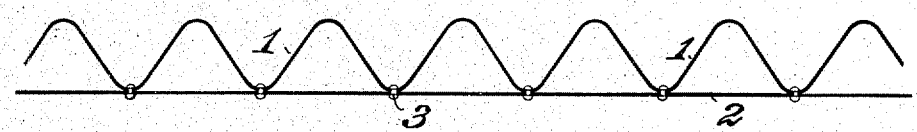
Figure 9:
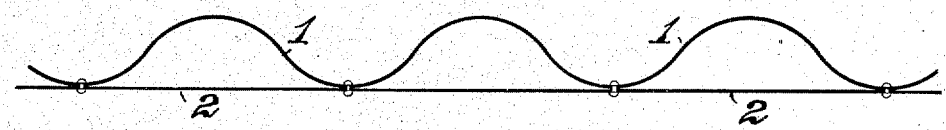
Figure 10:
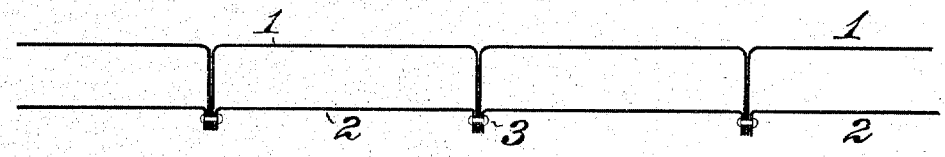
Figure 11:
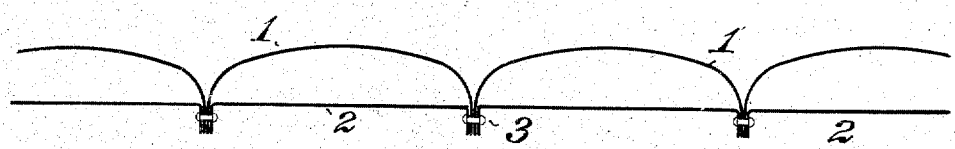

Various modifications in the form of the roof plates or sheets may be made, in the discretion of the constructor, without departure from the spirit and principle of our invention. Thus, for example, outside sheets, 1, which are curved or arched in the longitudinal plane of the roof as well as in the transverse plane, as indicated in Fig. 7, may be combined with inside sheets, 2, which are channeled in the longitudinal plane, instead of being arched, as indicated in Fig. 11, or outside sheets which are curved or bent in the longitudinal plane of the roof, may be combined with inside sheets which are not arched or bent in the longitudinal plane, as indicated in Figs. 8 and 9. Again, both the outside and the inside sheets may be channeled in the longitudinal plane of the roof, instead of being arched, as indicated in Fig. 10. In any case, however, one set of sheets is provided which are bent in both the longitudinal and the transverse plane of the roof.

We claim as our invention and desire to secure by Letters Patent:

1. A self-supporting roof for cars or the like, composed entirely of a plurality of independent sheet-metal plates, arched longitudinally of the roof and secured together at their transverse meeting edges, and also arched transversely of the roof.

2. A self-supporting roof for cars or the like, comprising a plurality of outside sheets, arched transversely of the roof, and a plurality of inside sheets, connected to but spaced away from said outside sheets, and bent or curved transversely of the roof.

3. A self-supporting roof for cars or the like, comprising a plurality of outside sheets, bent or curved transversely to the longitudinal direction of the roof, and a plurality of inside sheets arched longitudinally and transversely, and secured to said outside sheets in the planes of the versed sines of their arcs of longitudinal curvature.

4. In a self-supporting metal roof, the combination of a plurality of outside sheets, bent or curved transversely to the longitudinal direction of the roof, a plurality of inside sheets, spaced away from said outside sheets and arched both longitudinally and transversely, and means connecting said inside and outside sheets together, in the planes of the versed sines of their arcs of longitudinal curvature, whereby a continuous air space is provided between said inside and outside sheets.

5. In a metal roof, the combination of a plurality of outside sheets which are shaped transversely to any desired curvature, a plurality of connected inside sheets which are individually arched upwardly both longitudinally and transversely of the roof, connections securing said outside and inside sheets together in the planes of the versed sines of the arcs of longitudinal curvature of said inside sheets, upper frame members, and connections securing the sides of the outside and inside sheets to said frame members.

6. In a metal roof, the combination of a plurality of outside sheets which are shaped transversely to any desired curvature, a plurality of connected inside sheets which are individually arched upwardly both longitudinally and transversely of the roof, connections securing said outside and inside sheets together in the planes of the versed sines of the arcs of longitudinal curvature of said inside sheets, upper frame members, angle plates interposed between the ends of the inside sheets and the frame members, and secured to the inside sheets, and bolts connecting said angle plates to the upper frame members.

HENRY J. SMALL.
OTTO B. SCHOENKY.

Witnesses:
H. H. HUMMEL,
BEN BARTON.

---

Copies of this patent may be obtained for five cents each, by addressing the "Commissioner of Patents, Washington, D. C."